(12) United States Patent
Benedetti

(10) Patent No.: US 8,757,054 B2
(45) Date of Patent: Jun. 24, 2014

(54) APPARATUS FOR SINGULARIZING AND SEPARATING VEGETABLE PRODUCTS

(75) Inventor: Luca Benedetti, Ravenna (IT)

(73) Assignee: Unitec S.p.A., Lugo, Ravenna (IT)

( * ) Notice: Subject to any disclaimer, the term of this patent is extended or adjusted under 35 U.S.C. 154(b) by 0 days.

(21) Appl. No.: 13/381,439

(22) PCT Filed: Jul. 21, 2011

(86) PCT No.: PCT/EP2011/062557
§ 371 (c)(1),
(2), (4) Date: Dec. 29, 2011

(87) PCT Pub. No.: WO2012/028382
PCT Pub. Date: Mar. 8, 2012

(65) Prior Publication Data
US 2013/0145912 A1 Jun. 13, 2013

(30) Foreign Application Priority Data

Sep. 3, 2010 (IT) ............... PN2010A0048

(51) Int. Cl.
*A23N 15/02* (2006.01)
*A23N 15/04* (2006.01)
(52) U.S. Cl.
CPC ............... *A23N 15/02* (2013.01); *A23N 15/04* (2013.01)
USPC .................................. 99/638; 99/637; 99/643
(58) Field of Classification Search
CPC ..... A23N 15/02; A23N 15/04; A23N 15/025; A23N 15/003; A23N 15/01; A23N 15/00; B65G 47/24; B65G 47/244; B65G 47/26
USPC ............................ 99/638, 637, 642, 643, 635
See application file for complete search history.

(56) References Cited

U.S. PATENT DOCUMENTS

| | | | | |
|---|---|---|---|---|
| 1,029,918 A | * | 6/1912 | Dunkley | 99/638 |
| 1,526,573 A | * | 2/1925 | Triplett | 99/639 |
| 2,813,617 A | | 11/1957 | Sheetz | |

(Continued)

FOREIGN PATENT DOCUMENTS

| | | |
|---|---|---|
| EP | 1880959 | 1/2008 |
| FR | 2705536 | 12/1994 |

(Continued)

*Primary Examiner* — Reginald L Alexander
(74) *Attorney, Agent, or Firm* — Shoemaker and Mattare

(57) ABSTRACT

An apparatus for singularizing and separating cherries includes a product line defining a V-shaped slot and motorized belts installed on opposite walls defining the slot and arranged on the bottom thereof. The cherries are separated from their stems by circular blades rotating around axes preferably orthogonal to the direction of said "V" slot. Preferably, in the position corresponding to said rotating circular blades, on the upper edges of said opposite walls is installed a respective rising face, oriented upwardly and preferably inclined and lying on the same plane of the respective said opposite wall, parallel to the direction of said "V" slot, provided with a front edge that is downwardly oriented and inclined toward the direction of origin of the vegetable products. The lower corner of the rising face is substantially disposed on the upper edge of the respective opposite wall; the two lower portions of the two circular blades rotate at a height that is lower than the upper side of the respective rising face, and said circular blades are arranged externally of the upper sides of the respective said rising face.

12 Claims, 11 Drawing Sheets

(56) References Cited

U.S. PATENT DOCUMENTS 2,825,375 A * 3/1958 Gotelli et al. ............... 99/646 R
3,115,169 A   12/1963 Rodriguez et al.
3,115,170 A   12/1963 Rodriguez et al.

FOREIGN PATENT DOCUMENTS

| FR | 2829053 | 3/2003 |
| FR | 2846199 | 4/2004 |
| WO | 01/26491 | 4/2001 |

* cited by examiner

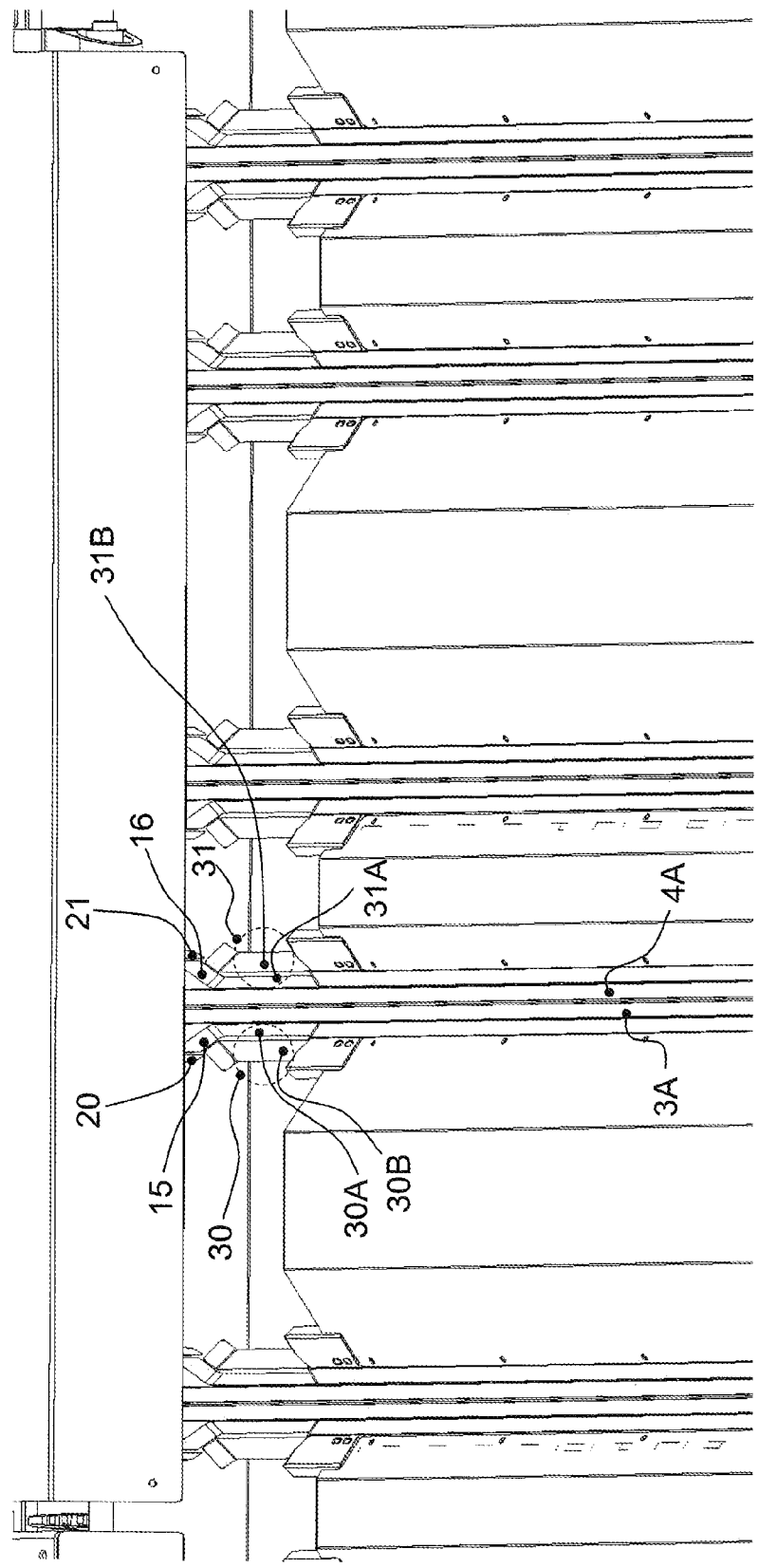

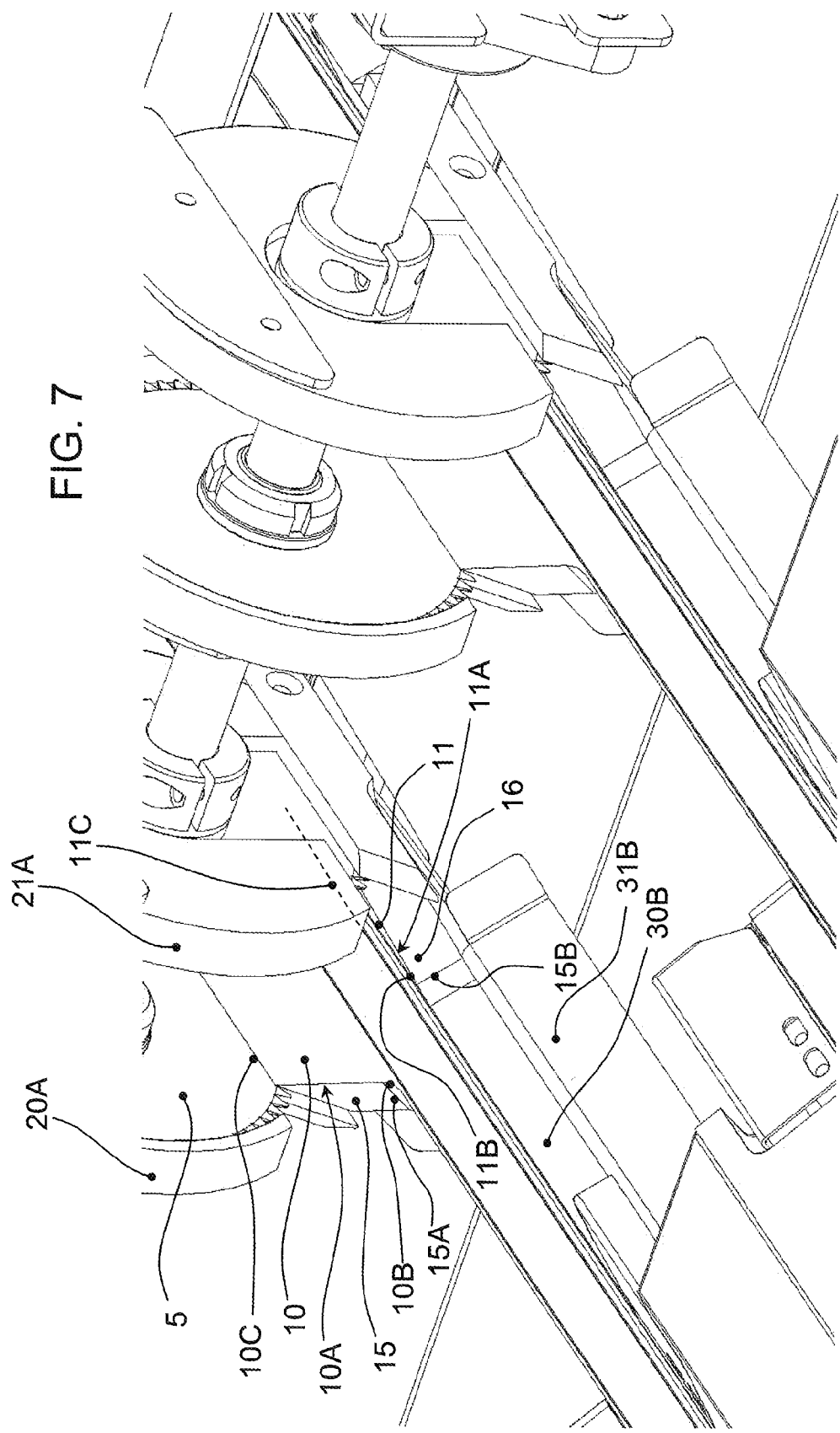

APPARATUS FOR SINGULARIZING AND SEPARATING VEGETABLE PRODUCTS

The present invention concerns an improved apparatus for the singularization and separation of agricultural or vegetable products that are joined to each other by relative connecting appendages, such as stalks, stems, peduncles, etc.

It is well known that, if and when such types of vegetable products are to be individually calibrated and measured according to one or more of their characteristics, such as weight, colour, shape, etc., they must first be separated from each other and suitably spaced and sequenced so as to avoid any uncertainty and inaccuracy during their measurement.

In general, these calibration operations are well known and easy to carry out without particular problems when the vegetable products are already provided and loaded onto the calibration apparatus in singular form, as is the case with apples, pears, melons, etc.

However, when the vegetable products to be processed are intrinsically joined in bundles or bunches, such as for example cherries, or beans, etc., it is evident that in order to singularize them (it is assumed that this term is well known to readers who are skilled in the field), it is essential to eliminate the vegetable elements, such as stalks, stems and peduncles, that keep these vegetable products bunched together.

For this purpose, various processes and means are known that are designed to separate said groups of products into singular products, that is, separate from each other.

Patents FR 2820287 and FR 2820413 disclose a respective method and apparatus that is suitable to separate the cherries that are joined by their stems.

Said two patents are discussed in detail in the subsequent Patent EP 2 149 518 A1, in the respective columns 1 and 2, to which reference is made here for brevity.

Here it is only pointed out that the main purpose of both said patents is to separate the bundles or bunches of cherries by means of their being drawn up into a suitable duct in which a flow of water containing said bundles is swirled, so as to produce the desired result, which consists of separating the cherries through the effect of the centrifugal force impressed on them.

However, as duly discussed and shown in said EP 2 149 518 A1, in both cases of the two previously mentioned patents the cherries are still poured out, and fall from a turning wheel or from a conveyor to the bottom of the collecting hopper that precedes the vertical whirling and centrifugation duct.

Thus, before being sucked up, the cherries are still considerably massed together.

The end effect, as is well know to an expert in the field, is that the subsequent separating action becomes more difficult and less efficient.

Further, neither of said two Patents FR 2820287 and FR 2820413 makes it possible to also perform the singularization process, which is absolutely essential to carry out on the individual products an efficient and suitable calibration procedure. It remains understood that the term "calibration" refers to one or more measurements of definite characteristics of the vegetable product, as exemplified above, and not only to their simple weighing or classification on the basis of size.

In order to make up for the problems of an insufficient separation shown by said two French patents, said EP 2 149 518 A1 patent, by the same applicant, teaches a method, and discloses a relative apparatus, in which the individual bunches of cherries are first singularized, and then are suitably separated in a centrifugation and swirling procedure of the type described above, and in which a hydraulic accelerator is used, based on a suitable skimming element, having the function of distancing the individual bunches of product.

The value of this method consists of the fact that the different bunches of vegetable products are singularized, that is, arranged sequentially, before the separation (centrifugation) operation, so as to achieve a twofold advantage of:

a) having the separation operation carried out on products that are already well spaced apart, and thus achieving the maximum effectiveness because every possible interference of a bunch of product with another nearby bunch of product is avoided, and b) as they are spaced apart, that is, singularized before their separation, the individual vegetable products also remain naturally singularized after this operation.

However, it has been shown that in certain circumstances, with heavy workloads and therefore with considerable concentrations of product, not all the bunches are necessarily subdivided into individual vegetable products separated from each other.

This fact can also obviously be easily understood if the products are still strongly joined to each other, as for example in the case of cherries that are still relatively unripe, etc.

Therefore, it may be that, in a real context in which these products are processed, some bunches remain joined together, and this condition evidently causes a twofold problem:

on the product, it is evident that the failure to separate the products implies that the products remain joined together through all the subsequent processes of singularization, sorting by size, and through to packing, with obvious negative consequences that are well known to an expert in the field;

on the subsequent processing equipment, the presence of whole bunches can cause a "clogging" effect, and therefore the jamming of said equipment; this is with particular reference to the case of an apparatus built according to Patent EP 1 880 959 A1, filed by the same applicant.

In particular, it was seen that if said conveying and singularization apparatus is fed with bunches of vegetable products that are not properly separated, as for example bunches of cherries that are still joined together by the relative stems, when said bunches reach the height of the "window 18", as they proceed along the conveying line, or "before line 5", they normally move in a position that projects therefrom and end up interfering with the walls and the devices at the beginning of said line 5. This situation can frequently cause the stoppage in the movement of said bunches, and obviously also the stoppage of all the subsequent sequence of products.

The final consequence is that the machine clogs up, which requires it to be stopped and restarted by hand, with easily imaginable operating problems and costs.

In order to avoid such drawbacks, it would be advisable to carry out a supplementary operation of physical separation of the individual vegetable products by cutting with conventional mechanical means that guarantee reliable results.

Patents FR 2 672 776 and ES 2 241 465 disclose, for example, the cutting of stalks or stems by means of suitably spaced circular saws. However, in these solutions the cutting means used, which in this case too are circular blades, are associated with means for conveying the vegetable products consisting of running cables, and therefore very different from the V-shaped slot associated with the power-driven belts of the present invention. In conclusion, the teaching of said patents cannot be used in any manner.

Further, Patent FR 2 829 053 cannot be considered as significant either, because in this case, too, the conveying means of the vegetable products consist of a simple flat running belt, associated with additional entirely different alignment and conveying means.

Moreover, in this case, too, there is no singularization action associated with the cutting, or separating, operation; in other words, the apparatus is not integrated to perform the two said different operations, which are, instead, the salient and most advantageous characteristic of the present invention.

It would therefore be desirable, and is the main objective of the present invention, to achieve a type of automatic apparatus that integrates both the operation of singularization of the vegetable products and the operation of separating said products, when these are still joined together.

Said apparatus must therefore be provided with means suitable to also provide the separation of such products, when they are not previously separated, through the cutting of said stalks or stems that keep such products joined together, so as to substantially reduce the above-described problems regarding both the products and the apparatus.

Said objective is achieved by an apparatus and a relative procedure designed and operating according to the enclosed claims.

Characteristics and advantages of the invention will become evident from the following description, given by way of non-limiting example, with reference to the accompanying drawings, wherein:

FIG. 5 shows a plane view from above of the apparatus illustrated in FIG. 1;

FIG. 7 shows a perspective view of the part of the apparatus illustrated generally in FIG. 6;

With reference to FIGS. 1 to 4A, an apparatus for the singularization and separation of vegetable products, in particular cherries, built according to the prior art, comprises a first conveying and singularization line for said products, defined in a V-shaped rectilinear slot 1, made in a body 2 integral with the structure of said apparatus, and delimited by two opposite reciprocally inclined walls 3, 4.

For the sake of simplicity and greater clarity, said apparatus is ideally of the type described in Patent EP 1 880 959 A1, and refers in particular to the portion of the "conveyor line" 5 in the position of the "window 18", as is also shown in the relative FIG. 5.

This apparatus is thus also provided with two motor-driven belts 3A and 4A installed on the respective said two opposite walls 3, 4 and arranged toward the bottom of the slot, and driven with a synchronous motion in a direction parallel to said slot.

According to the present invention, said apparatus comprises separation means suitable to separate two or more of said vegetable products connected by relative petioles or stalks, and that include one or more cutting means arranged in a lateral position, preferably symmetrical to said "V" slot.

Figure 2:
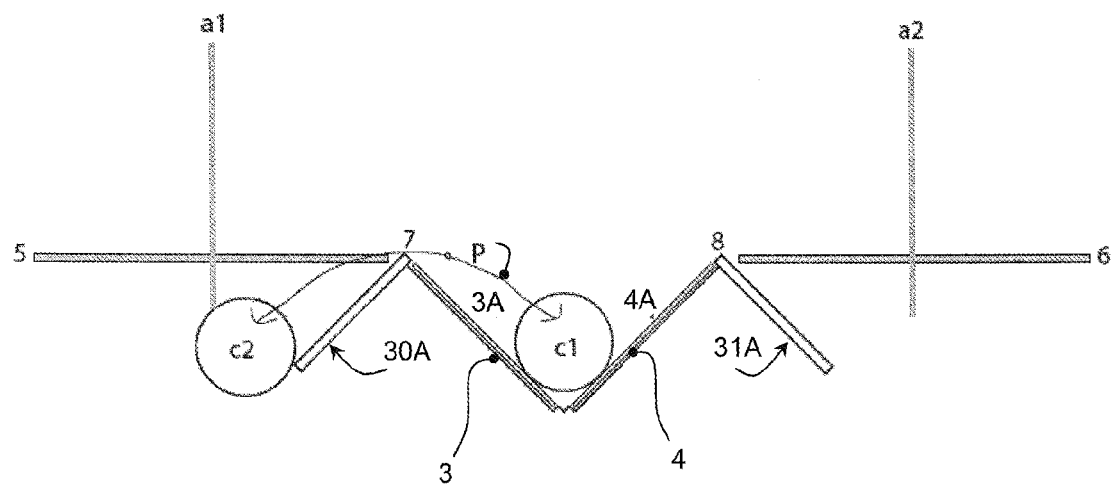
FIGS. 2 and 2A illustrate, respectively, a plane front view in a simplified symbolic form of a first embodiment of the invention, and a perspective view of said embodiment.
Figure 2A:
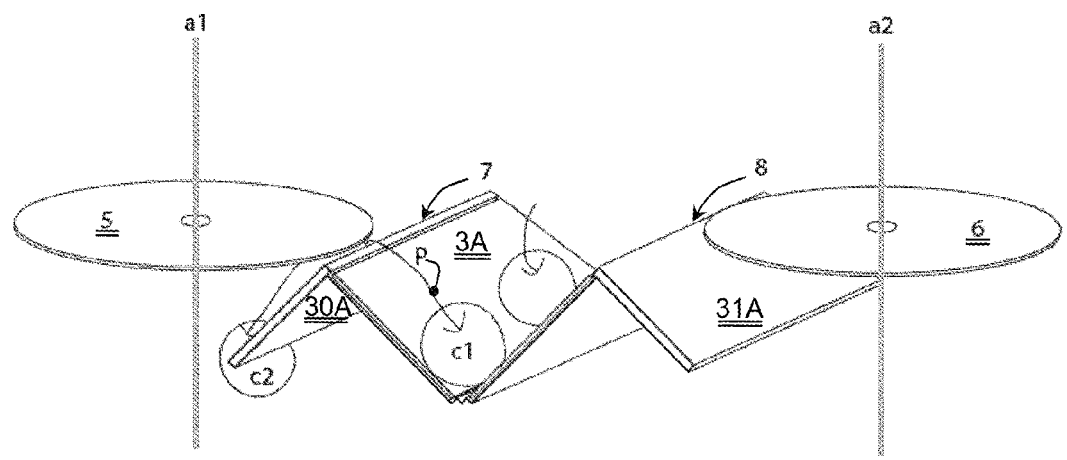

A first embodiment of said cutting blades and their positions is shown in FIGS. 2 and 2A. These cutting means consist of one, preferably two, rotating circular blades 5, 6 positioned on a horizontal plane, typically on the same plane, and rotate around two respective vertical axes a1 and a2, integral with the structure of the apparatus.

Moreover, as an essential functional element of the invention, the cutting means are mounted so that their blade brushes, from an external position, the upper edge 7, 8 of the respective opposite walls 3, 4, so that the blades can intercept the stem that joins the two cherries C1, C2, the first of which, C1, lies within said "V" slot, and the second, C2, lies outside said slot and is prevented from falling only because it is held by the stem.

The term just used above " . . . brushes the upper edge 7, 8 . . . " should not be understood in a literal sense, but should be read in the sense that said blades must be positioned with respect to the respective said upper edges so as to be able to effectively intercept said stems, and thus to cut them. In any case, further and different possible arrangements of said blades will be explained in detail later.

In these situations, the cherry C2, which falls outside the "V" slot, is connected to the cherry C1 by the stem "P" that inevitably passes over, and straddles, the upper edge 7 of the opposite wall 3, on the other side of which there is the external cherry C2.

In this case, it is evident that the respective horizontal blade 5 must be mounted at such a height and at such a distance from said upper edge 7 that, in every reasonably predictable case, it intercepts said stem "P" as the stem moves forward; in fact, since the stem is connected to the internal cherry C1, which is moved forward by effect of the synchronous movement of said belts 3A and 4A, it is consequently dragged in the same direction, so as to make it inevitable that at a certain position as it is being dragged along it is intercepted by said horizontal blade 5.

Figure 3:
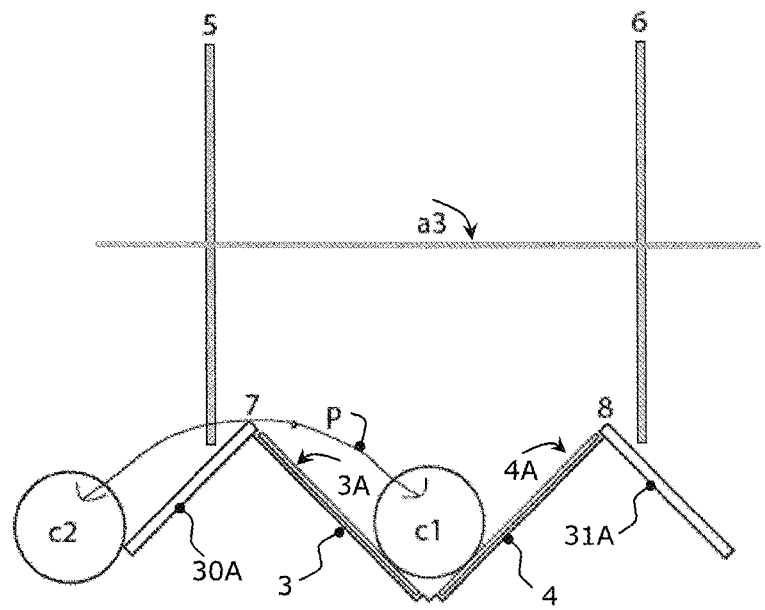
FIGS. 3 and 3A illustrate, respectively, a plane front view in a simplified symbolic form of a second embodiment of the invention, and a perspective view of said second embodiment.
Figure 3A:
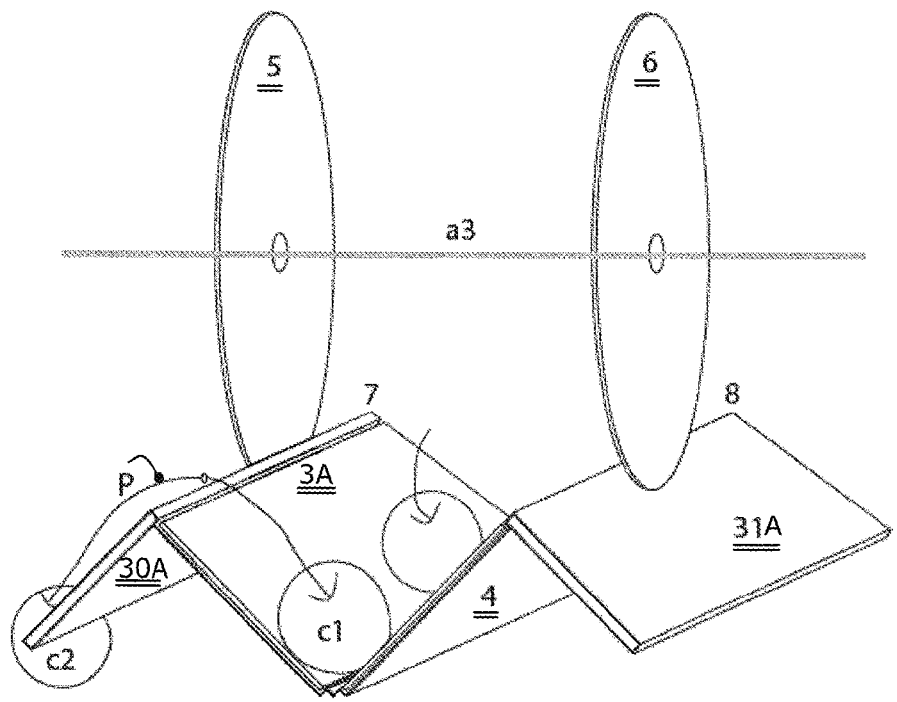

A second embodiment of said blades and of their position is shown in FIGS. 3 and 3A. These cutting means consist of one, or preferably two rotating circular blades 5, 6 (for simplification, the same numerical identifications are used to indicate identical or similar devices, irrespective of their position; it is assumed that this simplification will not generate any doubt for the expert in the field), which are positioned on two respective vertical planes in a position slightly external to the respective one of said upper edges 7 and 8, and rotate around the same horizontal axis a3, integral with the structure of the apparatus.

In this case, too, some considerations can be made that are altogether similar to the aforesaid ones, while obviously bearing in mind that the rotating blades should be considered as rotating on two respective vertical planes.

And thus, as an essential element for the operation of the present embodiment of the invention, they are arranged so that their blade brushes from an external position the upper edge 7, 8 of the respective opposite walls 3, 4, so that the blades can intercept the stem that joins two cherries C1, C2, the first one of which, C1, lies in said V-shaped slot, and the second, C2, lies outside said slot and is prevented from falling only because it is held by the stem.

The term just used above " . . . brushes the upper edge 7, 8 . . . " should not be understood in a literal sense, but should be read in the sense that said blades must be positioned with respect to the respective ones of said upper edges so as to be able to effectively intercept said stems, and thus to cut them.

In these situations, the cherry C2, that falls outside the V slot, is connected to the cherry C1 by the stem "P" that inevitably passes over, and straddles, the upper edge 7 of the opposite wall 3, on the other side of which there is the external cherry C2.

In this case, it is evident that the respective vertical blade 5 should be mounted at a height and a distance from said upper edge 7 such that, in any reasonably predictable case, it intercepts said stem "P" as the stem moves forward. In fact, since the stem is connected to the internal cherry C1, which is moved forward by effect of the synchronous movement of said belts 3A and 4A, it is consequently dragged in the same direction, so that it is inevitable that at a certain position as it is dragged along it is intercepted by said vertical blade 5.

In particular, and with reference to figures from 2 to 4A, said blades 5 and 6, which are those provided to cut the stems, are suitably lower than the upper edges 7, 8 of the respective opposite walls 3, 4, in order to guarantee a fail-safe cut; naturally, if the blades are horizontal like in FIGS. 2 and 2A, they are entirely located at a position lower than said upper edges.

A detailed discussion of the of the various peculiarities offered by the different possible inclinations of the blades is omitted, because a person skilled in the art is capable of selecting the best configuration for the existing needs and requirements.

Figure 4:
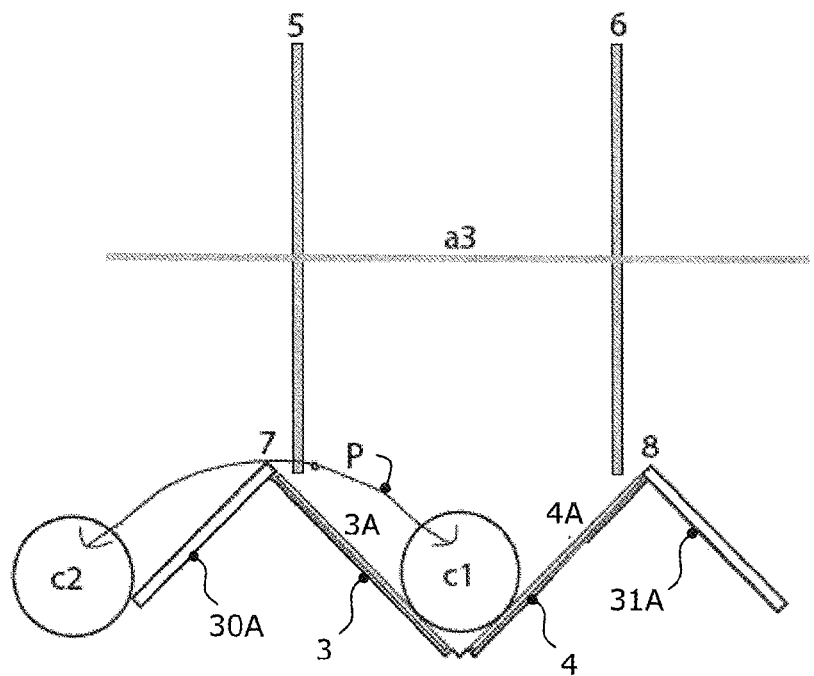
FIGS. 4 and 4A illustrate, respectively, a plane front view in a simplified symbolic form of a third embodiment of the invention, and a perspective view of said third embodiment.
Figure 4A:
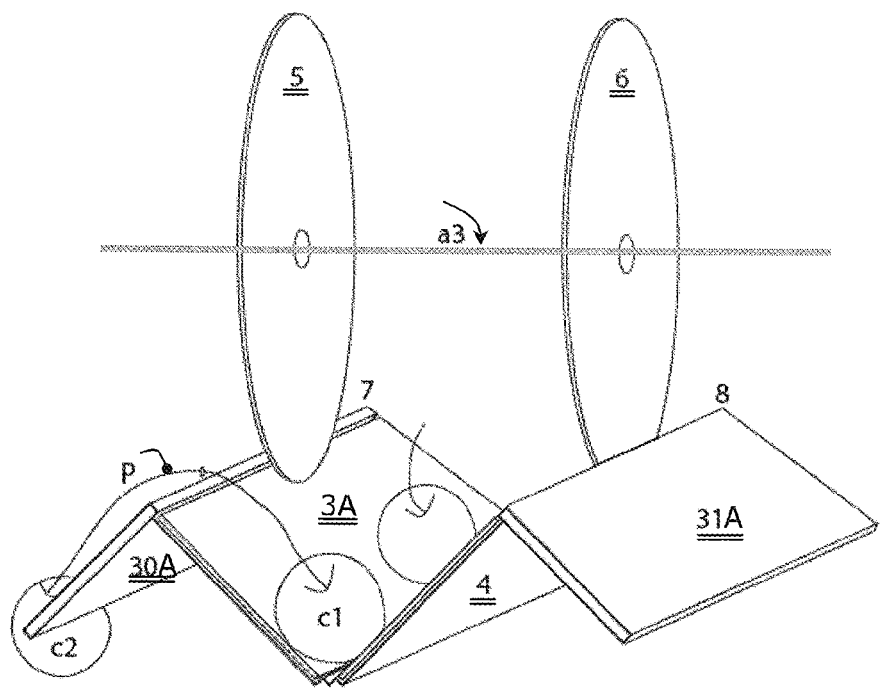

A third embodiment of said blades and their positioning is shown in FIGS. 4 and 4A; in this case, too, said cutting means consist of one, or better two rotating circular blades 5 and 6, mounted on respective vertical planes, as in the case of FIGS. 3 and 3A.

The only difference in the present case is that said rotating blades 5 and 6 are positioned inwardly of the respective said upper edges 7 and 8.

In the present case, too, the same descriptions can be given as in the previous case, and therefore for the sake of simplicity they are omitted here; the only point made is that in FIGS. 4 and 4A, and for the reasons explained earlier, the same numerical referees of FIGS. 3 and 3A are used.

With reference to FIGS. 2, 2A, 3, 3A, it is also pointed out that the orientation of said rotating blades 5 and 6, which in said figures is shown as being either horizontal, as in FIGS. 2 and 2A, or vertical, as in FIGS. 3 and 3A, can also be set in any inclined position included between said two horizontal or vertical positions.

In fact, the choice of a position of the rotating blades with a definite inclination may be ideal and an improvement over the previous solutions, due to various causes, such as for example peculiarities of the vegetable products to be processed, the inclination of the two opposite walls, the relationship between the size of the blades and the sizes of the stems to be cut, and in particular the degree in which the stems protrude from the respective upper edges of the relative said opposite walls, etc.

It was however noticed, during the functionality tests with vegetable products of different types and quality, that in certain circumstances the presence of said rotating circular blades alone, as shown in FIGS. 2 to 4A, may not be sufficient to cut with all the necessary certainty all the protruding stems that come along. In particular, there may be the situation in which, as shown in FIG. 3, the cherry C2 hangs outside, just past the relative opposite inclined wall 3, and thus its stem "P" is not intercepted by the relative rotating blade 5.

Evidently, this circumstance would hinder the overall functionality of the invention.

In order to overcome said drawback, some advantageous improvements are hereby offered and described.

1) With reference to FIGS. 5 to 10, at the point of transversal correspondence with the rotating circular blades 5 and 6 when they rotate on a horizontal axis (and thus said blades are set on a respective vertical plane), the upper edges 7 and 8 of the respective opposite inclined walls are provided with respective rising faces 10, 11 consisting of respective solid planes, that are upwardly oriented but that can also have more inclined positions, such as for example be positioned on the same inclined plane as the respective inclined opposite wall 3, 4.

Figure 6:
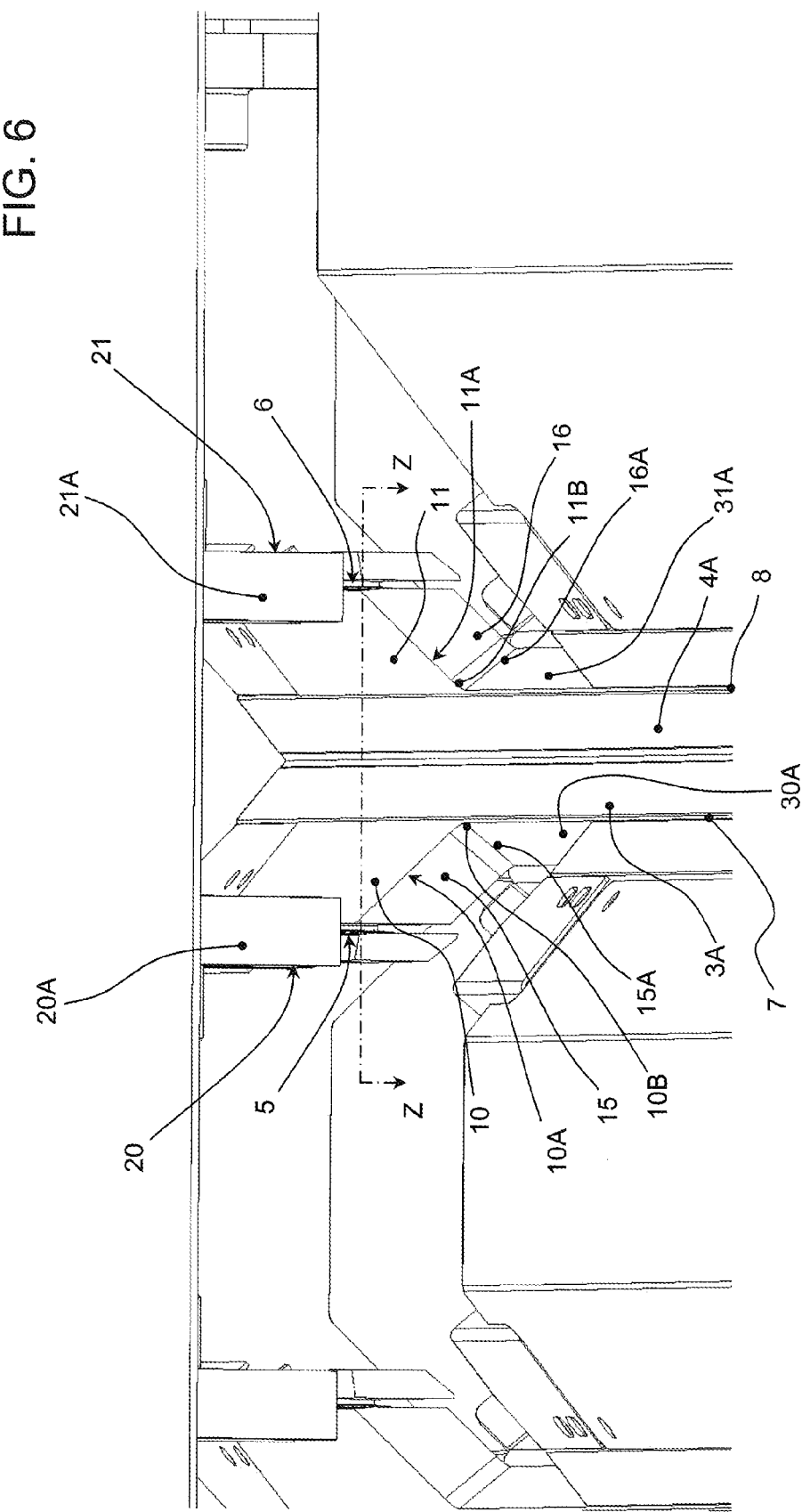
FIG. 6 shows an enlargement of one part of the apparatus seen in FIG. 5.
Figure 6A:
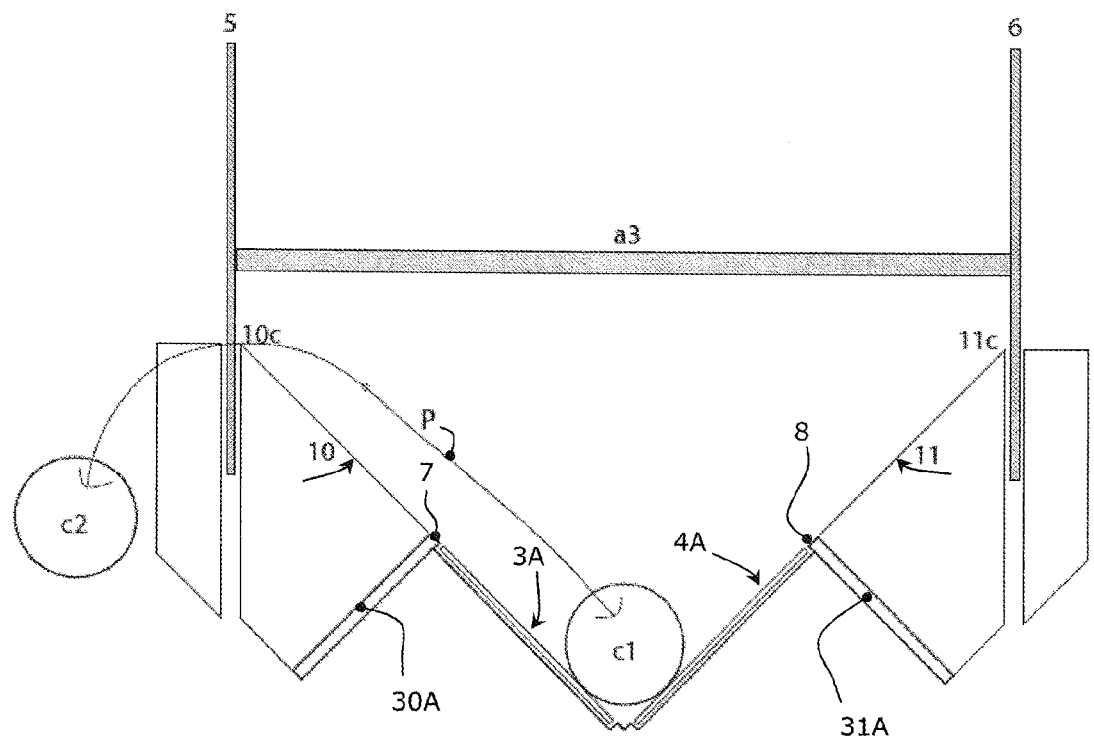
FIG. 6A illustrates a simplified perspective view of the enlargement of FIG. 6 according to the vertical cross-section plane of the same FIG. 6.

As shown in FIGS. 6 and 6A, said rising faces 10, 11 have a generally quadrilateral face in which the lower side lies, by construction and as explained above, along the upper edge of the respective opposite inclined wall, and in which the opposite side 10C, 11C is situated in a higher position.

The front edge 10A (and 11A) of said rising face is not at right angles with the respective upper edge 7, but is inclined on the latter in a direction oriented toward the direction of origin of said motorized belts 3A, 4A. Obviously, the lower corner 10B (and 11B) of the respective said front edge 10A (11A) is situated on a point of the respective upper edge 7 (and 8).

Figure 8:
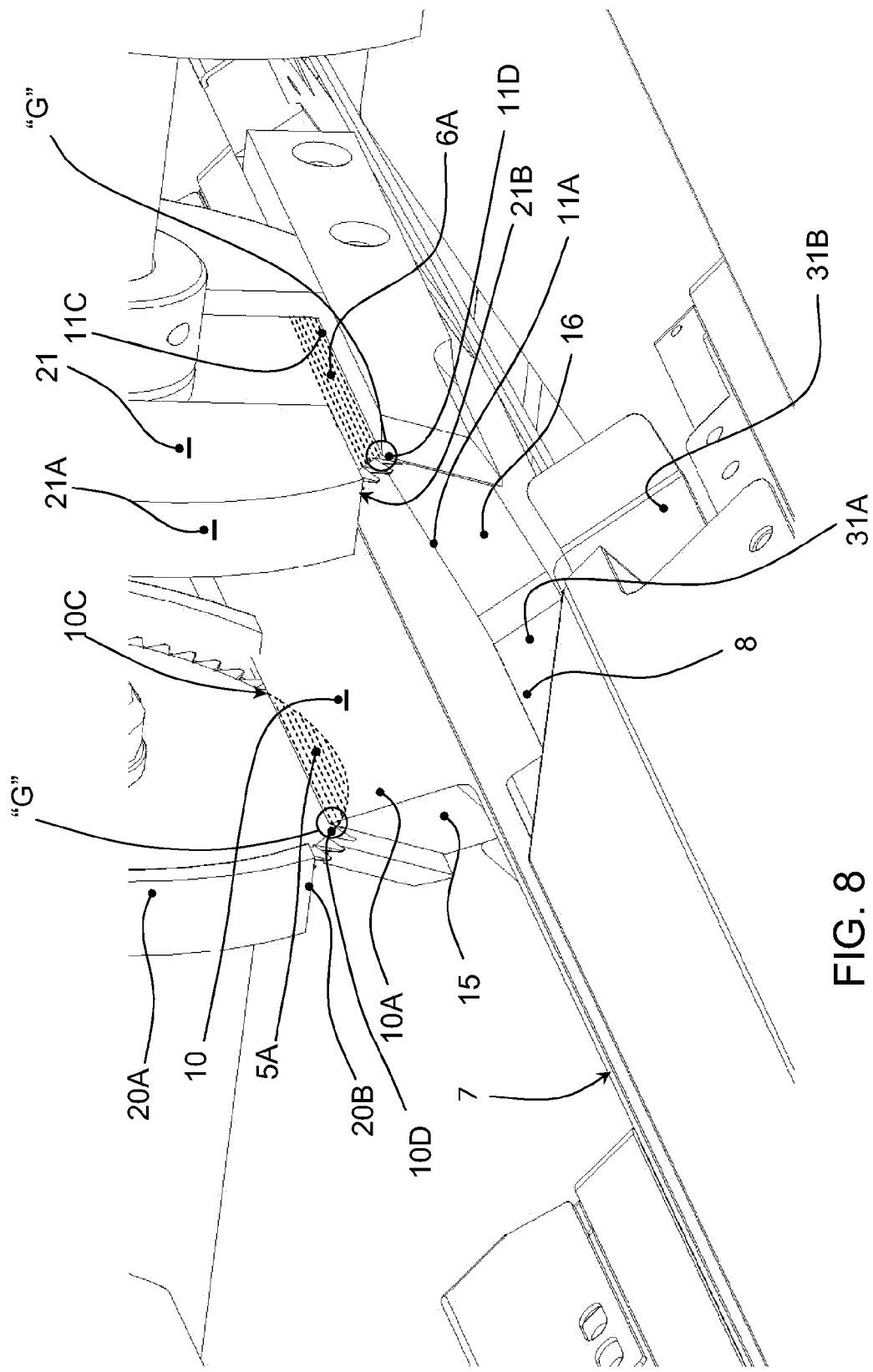
FIG. 8 shows an enlargement of one portion of the apparatus of FIG. 7.

The two rotating blades 5 and 6 are arranged outside the respective said rising faces 10 and 11 so that the two respective lower portions 5a and 6a lie no longer in a position lower than the respective upper edges 7 and 8, but are instead set in a position lower than the respective said upper edges 10C (FIG. 8).

The purpose of such a construction is that, when the two cherries C1 and C2 reach during their longitudinal movement the position in which said rising faces are arranged, the relative protruding stem "P", being dragged by the internal cherry C1, is lifted along the relative said front edge 10A so as to be in a direction toward the outside that is more favourable for the cutting operation of the respective rotating blade.

For this purpose it should be pointed out that the stems of the cherries are relatively rigid bodies, in the sense that they do not bend easily by effect of only the cantilevered weight of the cherry, and thus if said stems are lifted by effect of the respective rising face, as explained above, they, being forced to pass over the respective said upper edge 10C, will settle in a more or less horizontal position, which obviously facilitates their interception by the relative rotating blade 5, which is positioned just externally of the respective rising face.

In this situation it is also clear that the function of the respective said front edge 10A is to favour the lifting of the stem that impinges upon it; in fact, if this were not the case, there would be the concrete risk that the stem itself would be "captured" by the front edge 10A, which, if it was not suitably inclined upward, would not be able to lift the stem as desired.

Figure 10:
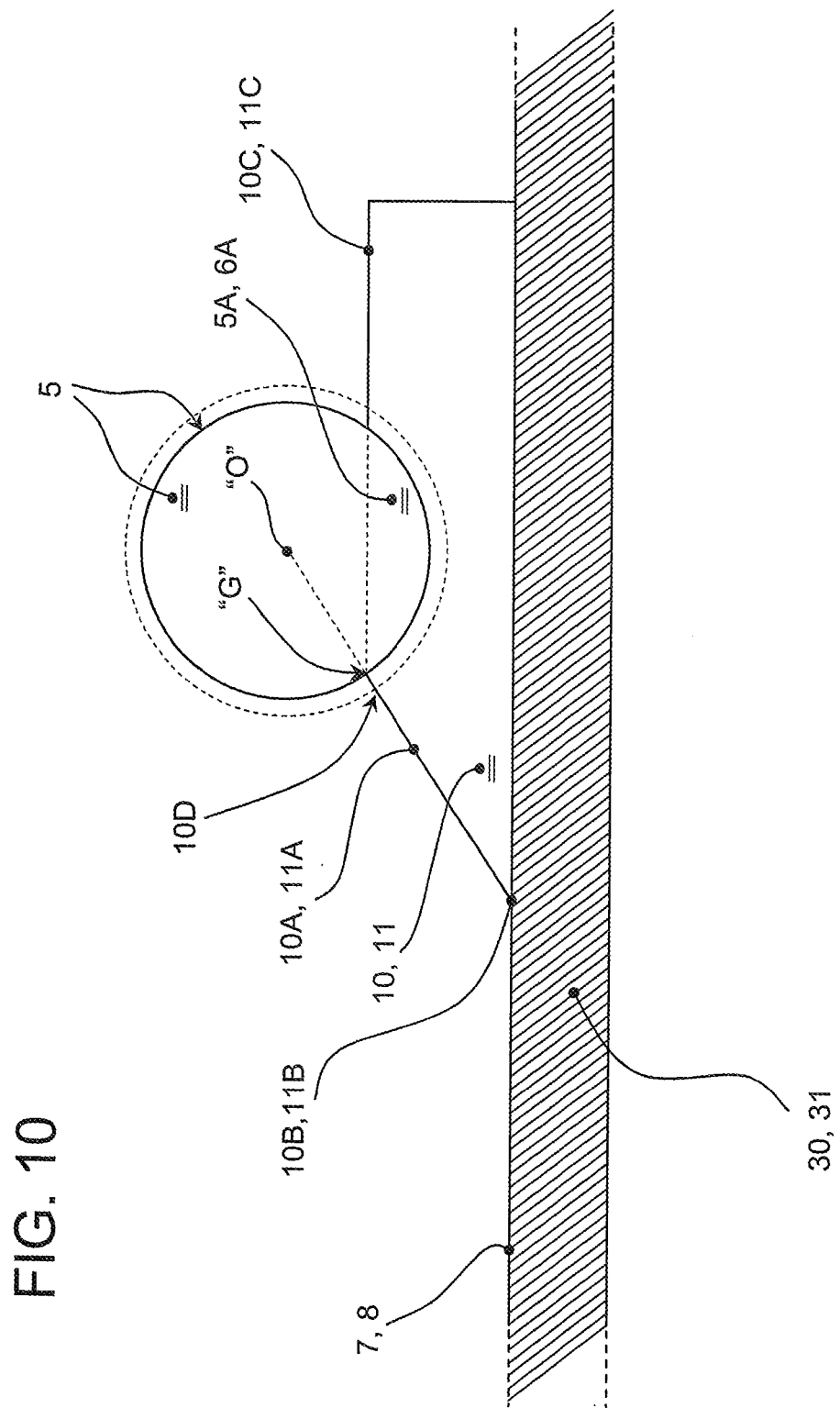
FIG. 10 shows a symbolic plane view of the part of FIG. 8 as seen from a vertical plane substantially parallel to the direction of movement of the vegetable articles.

2) A second improvement consists of the fact that, with particular reference to FIGS. 8 and 10, it is also an advantage that the upper corner 10D (which delimits said front edge 10A from the respective upper edge 10C) is substantially in correspondence with a fixed geometric position "G" located on the perimeter of said rotating circular blade (the blade rotates but this position on its perimeter remains fixed with respect to the rest of the apparatus); more precisely, its projection on a plane orthogonal to the axis of rotation of the respective blade 5 coincides with said fixed geometric position "G".

In practice, this becomes possible if, looking for simplicity at FIG. 10, the projection of said front edge 10A (and 11A) inwardly of the blade 5 passes substantially through the centre "O" of the blade.

In this manner, the stem is assuredly brought to the cutting position on the blade in an optimal position, thus avoiding the possibility of the stem being intercepted by the blade in an impractical and ineffectual position, as it is sufficient for said front edge 10A to simply guide the stem toward and against, but not past, the rotating blade.

Moreover, as will be immediately clear from the following improvement, the combination of the position of said upper corner 10D and of the inclination of the respective front edge 10A offers an optimum cutting mode.

3) With reference to FIG. 10, a further improvement consists of the fact that said front edge 10A tends substantially toward the centre "O" of the respective rotating circular blade 5; in fact, said edge 10A could be not perfectly aligned with said centre "O", as it is necessary to consider the fact that said centre "O" is located on the respective blade 5, which may be at a certain distance from the respective rising face 10, on which the respective edge 10A is located.

Therefore, this improvement, combined with the previous one, creates a situation wherein the stem is brought against the rotating blade with a "frontward" movement, that is, orthogonal to the tangent of the blade itself in said fixed position "G".

It is evident that this circumstance generates the best conditions for a fail-safe cut, as common experience teaches (in fact, this avoids the possibility of the stem inadvertently tangentially avoiding being cut by the blade).

4) With reference to FIGS. 8 and 10, a further improvement consists of the fact that said rising face 10, 11 extends rearward so as to "cover" the lower portion 5A, 6A of the respective rotating blade, that is, to extend, again on a plane orthogonal to the axis of rotation of the rotating blades, against said lower portion.

This solution is evidently designed for the purpose of protecting said lower portion of the rotating blades from the intrusion of foreign bodies, and in particular for reasons of safety.

Figure 1:
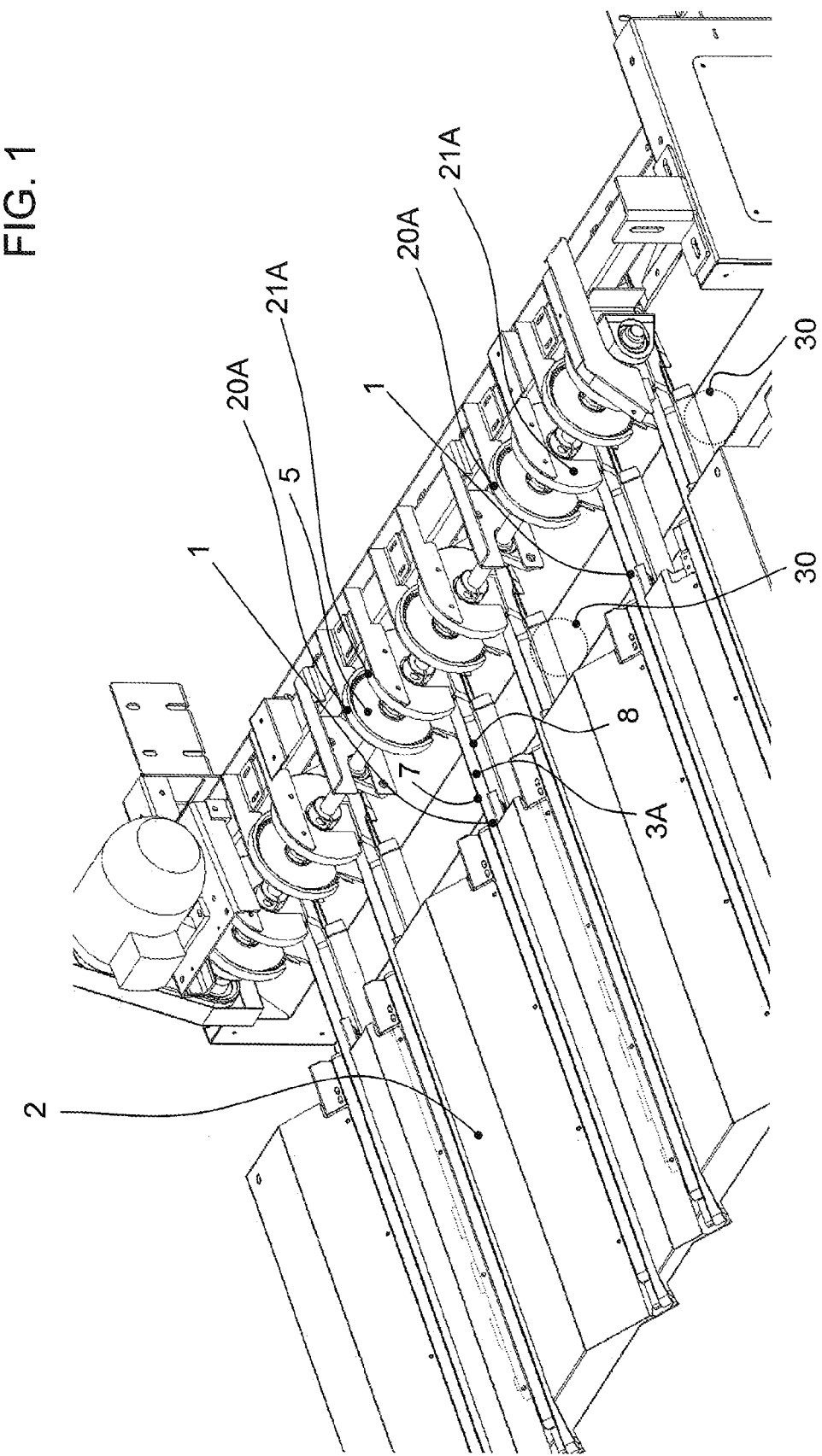
FIG. 1 illustrates an external perspective view of an apparatus according to the invention as seen from a diagonal position.

5) With reference to FIGS. 1 and 5, externally of said two rotating circular blades 5, 6 is provided, again obviously for safety reasons, a respective protecting casing 20, 21 integral with the structure of the apparatus.

It is pointed out that, although the apparatus has been described as referring to a single V-shaped slot, in effect in the industrial embodiment the invention is replicated by a plurality of "V" slots, arranged parallel to each other, as shown in FIG. 1; it is also obvious that each one of said slots is provided withall the respective components and devices described above for a single slot.

6) With reference to the same figures, said two external protecting casings are completed with two respective prominent edges 20A, 21A, respectively, that enclose externally the perimeter of said rotating blades. In addition, naturally, to completing the protection of said rotating blades, said two prominent edges 20A, 21A end at the bottom at points 20B and 21B (see FIGS. 8, 9) short of reaching the position where said rotating blades are housed, for the simple obvious reason that between said prominent edges and the respective said rising faces 10 and 11 must be allowed the passage of said stems "P"; the fact that said prominent edges 20A, 21A are interrupted at said points 20B and 21B makes it possible to provide said passage.

7) With reference to figures from 1 to 5, said two opposite walls are accompanied, before reaching the station of said rotating blades, by respective solid surfaces 30, 31, shown only in a simplified manner, that extend along said slot and laterally and that start from the respective said upper edges 7, 8 and that slope briefly downwardly and outwardly in an inclined progression.

The purpose of said solid surfaces is similar to the "plates 51" disclosed in the cited Patent EP 1 880 959 A1, and thus it is to favour the guided drop of the cherries that are present outside the "V" slot.

Preferably, as shown in FIGS. 5, 6, 6A and 7, said solid surfaces 30, 31 are built with two distinct and separate bodies, wherein a first body 30A, 31A, respectively, is made integrally with the respective opposite inclined walls 3, 4 or joined to them, and branches from the respective said upper edges 7, 8, while the second body 30B and 31B, respectively, is placed at a lower position for reasons of constructive optimization.

8) With reference again to figures from 5 to 8, an essential improvement consists of the fact that from said front edges 10A, 11A of the respective rising faces 10, 11 are arranged and connected two respective substantially planar elements 15, 16, which for reasons that will be immediately clear will be referred to as "spreading elements".

Said spreading elements 15 and 16 are arranged with a double orientation: in fact, they are oriented downward and at the same time, with their lower portion, they are oriented toward the direction of origin of the motorized belts 3A and 4A.

In addition, they are also joined on one side to the respective said front edge 10A, 11A of the respective rising faces 10, 11, and on the respective adjacent side 15A, 16A to the respective said first body 30A, 31A; in particular see FIGS. 6 and 7.

The function of said spreading elements 15 and 16 is to widen further the opening angle of the two parts of the stem that move up to the cutting position. In fact, in this manner the cutting operation is made even more fail-safe and precise, as the cut is made not only in a "frontward" direction as explained above, but also the orientation of the stem is spread further and thus it is more transversal to the plane of rotation of the two rotating blades.

Figure 9:
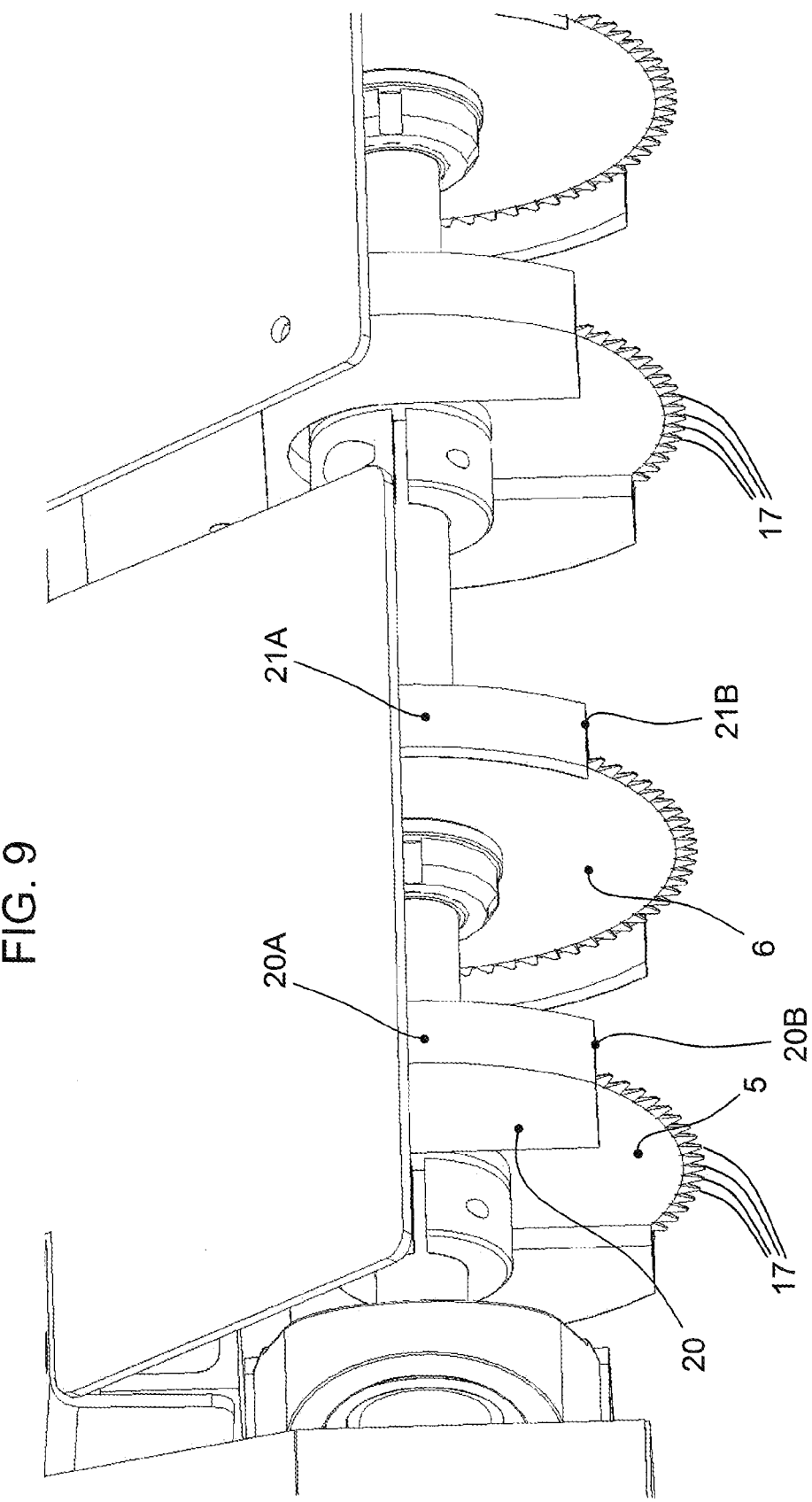
FIG. 9 shows a different external view of another part of the apparatus of FIG. 1.

9) Finally, it was also found experimentally that the cutting edge of said rotating blades 5 and 6 can be either continuous or, preferably, a serrated edge 17 (shown in most of the figures) and most evident in FIG. 9, so that said cutting blades are exactly like circular rotating saws.

It may have been noticed that the foregoing description referred sometimes indifferently to components and devices located on one side of the "V" slot, and sometimes to components located on both the opposite sides of the same.

This differentiation was given only to provide a more precise explanation, and has no meaning implying exclusion of similar components and devices not explicitly described, because the apparatus is substantially symmetrical with respect to a vertical plane passing through the centre of said "V" slot.

The invention claimed is:
1. Apparatus for the singularization and the separation of vegetable products, especially cherries, and comprising
a conveying and singularization line for said products, said line defining a "V" slot having rectilinear configuration in a body solid with the frame of said apparatus, and delimited by two opposed walls inclined to each other,
two first motorized belts arranged on said opposed walls and placed on the bottom of said slot and acted with synchronous motion on a direction parallel to said slot, separation means for separating two or more said vegetable products connected each other by respective stalks, said separation means including one or more cutting means placed at a side position with respect to said "V" slot, said cutting means comprising at least one circular blade rotating around a respective axis which lies on a plane essentially orthogonal to the direction of said "V" slot, a lower portion of said at least one circular blade rotating at a level which is lower than the upper edges of said two opposed walls.

2. Apparatus according to claim 1, comprising two circular blades disposed outside of the upper edges of said opposed walls.

3. Apparatus according to claim 1, wherein, in correspondence of said rotating circular blades, on said upper edges of said opposed walls a respective rising face is arranged, defined by a solid and substantially flat surface, generally upwards oriented and preferably inclined and laying on the same plane of the respective opposed wall, parallel to the inclination of said slot "V", provided with a respective front edge which is oriented downwards and inclined towards the source direction of said vegetable products, and whose lower corner is substantially placed on the upper edge of the respective said opposed wall, the lower portions of said circular blades do rotate at a level lower than the upper side of the respective said rising face, and said circular blades are arranged outside of the upper sides of the respective rising face.

4. Apparatus according to claim 3, wherein the upper corner of said front edge of the respective rising face:

is placed at the same level of the geometrical position on the circular perimeter of the respective circular blade, and its projection on a plane orthogonal to the rotation axis of said circular blades clashes substantially with said position of said circular perimeter.

5. Apparatus according to claim 3, wherein said front edge is generally aligned to the centre of the respective rotating circular blade.

6. Apparatus according to claim 3, wherein said rising face extends backwards so as to basically project against the lower portion of the respective circular blade.

7. Apparatus according to claim 2, wherein, outside said two circular blades, a respective protecting casing is formed, which is firm to the apparatus frame.

8. Apparatus according to claim 7, wherein said protecting casing is provided with a protruding strip enclosing, by encircling the outer perimeter, the respective rotating blade until almost the front corner of the respective said front edge.

9. Apparatus according to claim 3, wherein from said upper edges of said rising faces, and before said circular blades, two respective solid surfaces branch out, which are preferably flat, generally oriented downwards and inclined outwards from the opposed sides of said slot.

10. Apparatus according to claim 9, wherein said two solid surfaces are made up of two separate bodies, wherein a first body is connected to the respective upper edge of the respective opposed wall.

11. Apparatus according to claim 3, wherein from said front edges of respective said rising faces two respective wide apart members are connected:

generally flat and four-sided, inclined outwards from the opposed side of said "V" slot, oriented downwards and in the same time towards the source direction of said motorized belts, and also connected with a respective adjacent side, to the respective first body.

12. Apparatus according to claim 1, wherein the outer rim of said at least one circular blade is provided with a respective plurality of cutting teeth.

* * * * *